(12) United States Patent
Fontenot et al.

(10) Patent No.: US 8,365,172 B2
(45) Date of Patent: Jan. 29, 2013

(54) HORIZONTAL SCALING OF STREAM PROCESSING

(75) Inventors: Nathan D. Fontenot, Georgetown, TX (US); Jacob Lorien Moilanen, Austin, TX (US); Joel Howard Schopp, Austin, TX (US); Michael Thomas Strosaker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1183 days.

(21) Appl. No.: 12/116,268

(22) Filed: May 7, 2008

(65) Prior Publication Data

US 2009/0282217 A1 Nov. 12, 2009

(51) Int. Cl.
*G06F 9/46* (2006.01)

(52) U.S. Cl. ............................ 718/102; 718/103; 712/32
(58) Field of Classification Search ........................ None
See application file for complete search history.

(56) References Cited

U.S. PATENT DOCUMENTS

| | | | | |
|---|---|---|---|---|
| 5,884,077 | A * | 3/1999 | Suzuki ........................... | 718/105 |
| 5,905,881 | A * | 5/1999 | Tran et al. ...................... | 712/219 |
| 6,986,140 | B2 * | 1/2006 | Brenner et al. ................ | 718/105 |
| 2006/0224826 | A1 * | 10/2006 | Arai et al. ..................... | 711/114 |

OTHER PUBLICATIONS

Michael K. Bradshaw (A Reconfigurable, On-The-Fly, Resource-Aware, Streaming Pipeline Scheduler, 2005).*
Bradshaw et al., "A Reconfigurable, On-The-Fly, Resource-Aware, Steaming Pipeline Scheduler", 5 pages.
Bischoff et al., "Formal Implementation Verification of the Bus Interface Unit for the Alpha 21264 Microprocessor", 1997, IEEE, pp. 16-24.

* cited by examiner

*Primary Examiner* — Emerson Puente
*Assistant Examiner* — Sisley Kim
(74) *Attorney, Agent, or Firm* — Yee & Associates, P.C.; Steven L. Bennett

(57) ABSTRACT

A computer implemented method, data processing system, and computer program product for dynamically scheduling algorithms in a pipeline which operate on a stream of data. The illustrative embodiments determine a computational cost of each algorithm in a plurality of algorithms in a pipeline. The plurality of algorithms in the pipeline processes an incoming data stream in a first sequential algorithm order. The illustrative embodiments reorder the plurality of algorithms in the pipeline to form a second sequential algorithm order based on the computational cost of each algorithm. The plurality of algorithms may then be executed in the second sequential algorithm order. When the illustrative embodiments assign a spare processing unit to an algorithm at an end of the pipeline, the computational cost of each algorithm in the plurality of algorithms in the pipeline is redetermined.

20 Claims, 4 Drawing Sheets

HORIZONTAL SCALING OF STREAM PROCESSING

BACKGROUND OF THE INVENTION

1. Field of the Invention

Embodiments of the present invention relate generally to an improved data processing system and in particular to data stream processing. More specifically, the embodiments of the present invention provide a system for dynamically scheduling algorithms in a pipeline which operate on a stream of data.

2. Description of the Related Art

A data stream is a real-time, continuous, ordered sequence of items. The items in the data stream may be ordered based on arrival time or explicitly by timestamp. Continuous data streams naturally arise in domains such as network monitoring (e.g., telephone call records or web usage logs), sensor networks (e.g., measuring meteorological data), financial analysis, among others. Applications used to process the arriving data streams do not store the data streams in a repository, but rather process the data streams on-the-fly using continuous algorithms which require a limited amount of memory.

In data stream processing, there is a class of computational problems known as streaming problems. One example of a streaming problem is when a large amount of continuous data is received at the processing application. The processing application runs a number of processing algorithms on the data stream, usually in parallel. These processing algorithms comprise queries which operate on the data streams to locate a match to a query. If data in the stream is found to match a query (or a plurality of queries) in the processing algorithms, the processing application identifies the data stream as 'relevant' and stores the data for future (and often more in depth) analysis. If no query match is found in the data, the processing application identifies the data stream as 'not relevant' and discards the stream. Thus, a relevant data stream is a stream that contains a match to at least one query in the processing algorithms, and a non-relevant data stream is a stream that does not match any of the queries in the processing algorithms.

An example of an existing data stream processing application is SETI (Search for Extra-Terrestrial Intelligence). In the search for extraterrestrial life, numerous algorithms are used to find intelligent patterns in continuous data signal transmissions received from space.

BRIEF SUMMARY OF THE INVENTION

The illustrative embodiments provide a computer implemented method, data processing system, and computer program product for dynamically scheduling algorithms in a pipeline which operate on a stream of data. The illustrative embodiments determine a computational cost of each algorithm in a plurality of algorithms in a pipeline. The plurality of algorithms in the pipeline processes an incoming data stream in a first sequential algorithm order. The illustrative embodiments reorder the plurality of algorithms in the pipeline to form a second sequential algorithm order based on the computational cost of each algorithm. The plurality of algorithms may then be executed in the second sequential algorithm order. When the illustrative embodiments assign a spare processing unit to an algorithm at an end of the pipeline, the computational cost of each algorithm in the plurality of algorithms in the pipeline is redetermined.

DETAILED DESCRIPTION OF THE INVENTION

Figure 1:
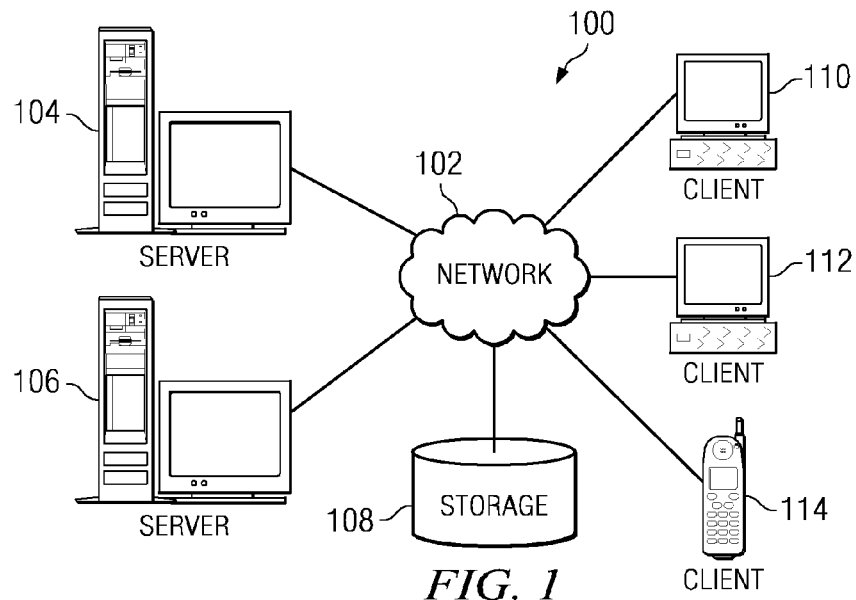
FIG. 1 depicts a pictorial representation of a distributed data processing system in which the illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
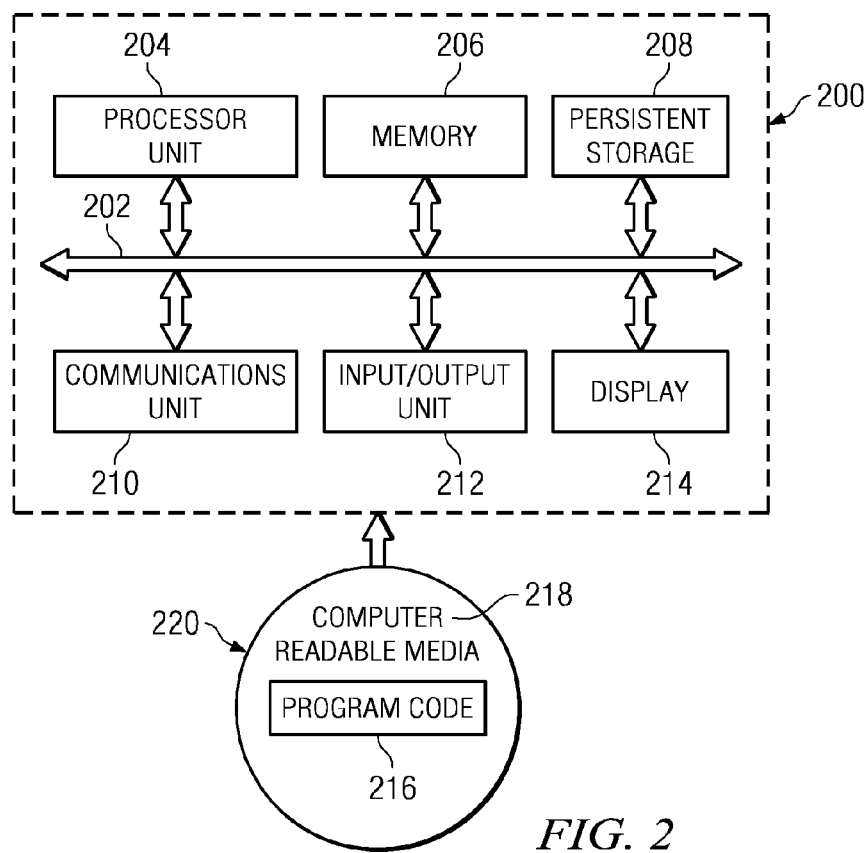
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse.

Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As previously mentioned, the processing of a data stream by one algorithm in a processing application may identify a stream as either being relevant and needing to be archived for further examination, or as being irrelevant and needing to be discarded. Some processing applications may comprise algorithms which process a data stream in parallel. Processing a data stream in parallel allows a plurality of processing algorithms to simultaneous operate on the data stream to identify whether the data stream is relevant or not. One or more of the processing algorithms may find a match to their individual queries of the data stream. In contrast, some processing applications may comprise algorithms which process a data stream serially in stages in a pipeline. Processing a data stream serially allows only one processing algorithm to operate on the data stream to identify whether the data stream is relevant or not. If one of the algorithms in the processing application identifies the stream as relevant, the processing application does not allow the stream to run through any of the remaining algorithms in the pipeline. Rather, the processing application skips the remaining algorithms and archives the stream for further examination by more computationally intensive algorithms or by human analysis. By processing a data stream serially instead of in parallel, the total computational effort of the processing application may be reduced by not having to run all processing algorithms on all streams.

The illustrative embodiments provide a mechanism which reduces the overall computational power required by an application when processing a data stream by processing data streams serially in a pipeline. In particular, the mechanism of the illustrative embodiments reorders the processing algorithms in the pipeline in order of computational cost. The computational cost of an algorithm may be calculated as the amount of processor resources needed to analyze a given volume of data. For example, if there are two processors that are able to analyze 4 MB of data per second, the computational cost would be ½ processor per MB/sec. The processing algorithms are reordered to place those algorithms determined to have a lower computational cost per stream at the front of the pipeline, and algorithms determined to have a higher computational cost at the end of the pipeline. The processing application may determine the computational cost of an algorithm based on how often a match is found in the data streams using the algorithm. An algorithm with a higher match rate per stream is deemed to have a lower computational cost (and a higher throughput), while an algorithm with a lower match rate per stream is deemed to have a higher computational cost (lower throughput). Thus, an algorithm with a higher throughput per data stream has a lower computation cost for the application (i.e., the algorithm is more efficient), while an algorithm with a lower throughput per data stream has a higher computational cost for the application (i.e., the algorithm is less efficient). The computational cost may also be adjusted to take into account the data the algorithm will remove from the remainder of the processing stream. For example, the computational cost of an algorithm may be adjusted by multiplying by the rate at which data continues to the next algorithm in the pipeline. For example, if an algorithm matched 5% of incoming data but lets 95% of the data through, using the example above, the adjusted computational cost of the algorithm would be 0.5 processor/MB/sec*0.95=0.475 processor/MB/sec. Likewise, if the algorithm matches 75% of the incoming data and allows 25% of the data through, the adjusted computational cost of the algorithm would be 0.5 processor/MB/sec*0.25=0.125 processor/MB/sec.

Since the algorithms at the front of the pipeline have a higher likelihood of finding a match in a data stream (and the processing application will archive those data streams in which a match is found), the algorithms at the end of the pipeline (and with the higher computational cost) will likely have fewer data streams to process. Reordering the algorithms in this manner reduces the power needed to process a data stream, since the processing application does not allow a stream to run through remaining algorithms in the pipeline once a match is found in a previously run algorithm.

In addition to reordering algorithms in a data stream processing pipeline in order of computational cost, the mechanism of the illustrative embodiments allow for adding more computational power to individual processing algorithms in the pipeline to increase the entire system's throughput. An existing problem with adding more computation power to increase the entire system's throughput is deciding where (which algorithms) to add the computational power. Determining where to add the computation power requires knowing the computational costs of the algorithms per data stream, as well as how many data streams will be coming though the pipeline at each point in the pipeline. To further complicate matters, the computational cost and throughput of each algorithm may vary as the workload changes. Consequently, knowing exactly where to add the computational power becomes a moving target. The illustrative embodiments allow for increasing the system's throughput by adding extra processing capacity to the end of the pipeline (i.e., the algorithm with the lowest throughput) as appropriate. For example, if there is one spare processor (or spare machine) available to be assigned to an algorithm in the pipeline, the spare processor is assigned to the last algorithm in the pipeline. Thus, the last algorithm may now have two processors to operate on the data stream, thereby increasing the throughput of that algorithm. The mechanism in the illustrative embodiments then reevaluates the computational cost of each algorithm in the pipeline to determine if the algorithms should be reordered based on the addition of the spare processor which changed the throughput of the algorithm. The bottleneck of the processing application (the algorithm with the lowest throughput and therefore highest computational cost) will always be located at the end of the pipeline. Thus, algorithms with a higher throughput and lowest computational cost are moved to the front of the pipeline, while algorithms with the lower throughput and highest computational cost are moved to the end of the pipeline. In this manner, the system may dynamically re-adjust the pipeline order to accommodate changing workloads.

The system also undergoes a re-evaluation after a predetermined amount of time has passed. The re-evaluation of the system comprises determining if there is a spare processor available to add extra capacity to the end of the pipeline. If there is a spare processor, the application assigns the spare processor to the last algorithm in the pipeline (the one with the highest computational cost/lowest throughput) to increase the throughput of that algorithm. However, if there are no spare processors, the application reclaims a processor from the algorithm at the front of the pipeline that has the lowest computational cost and that has more than one processor assigned. That reclaimed processor is then assigned to the last algorithm in the pipeline.

Figure 3:
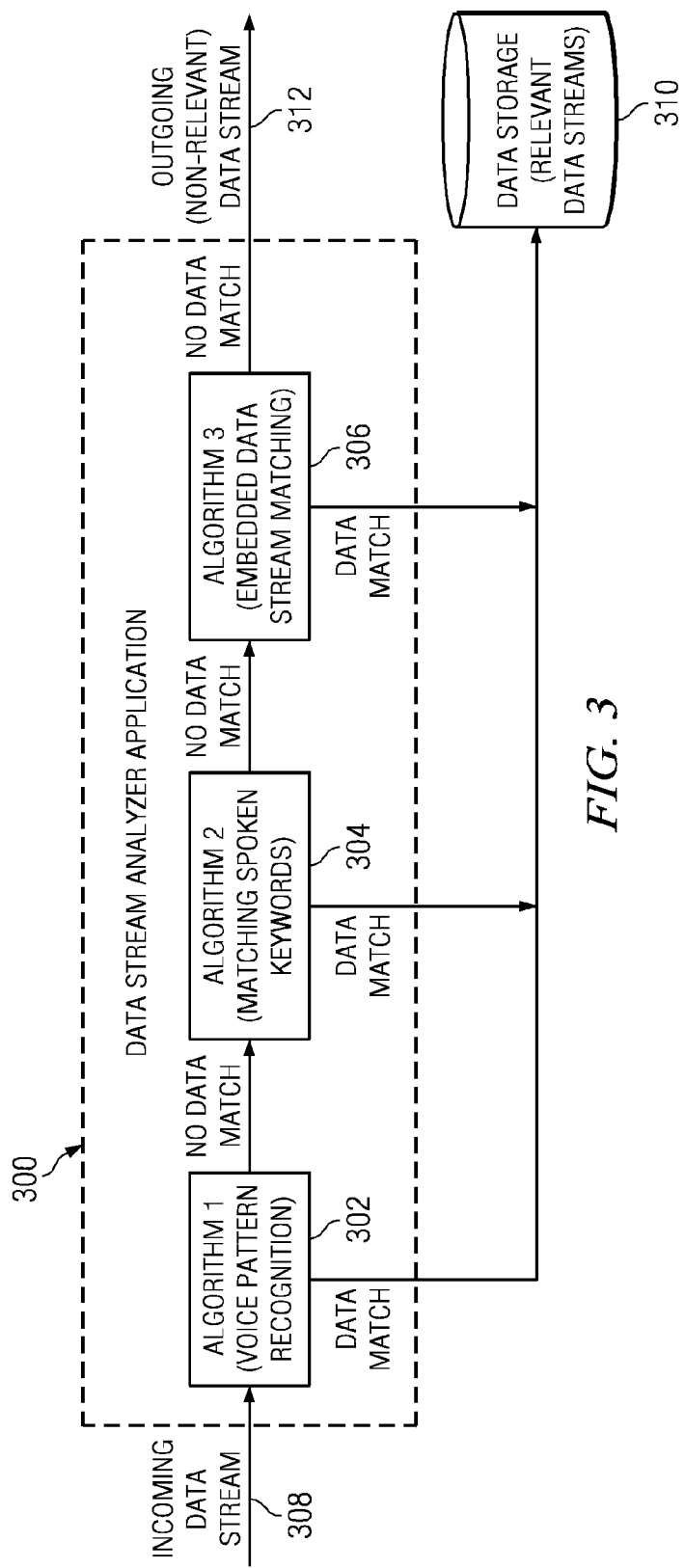
FIG. 3 is a block diagram of an exemplary data stream analyzer system in accordance with the illustrative embodiments.

FIG. 3 is a block diagram of an exemplary data stream analyzer system in accordance with the illustrative embodiments. Data stream analyzer application 300 may be implemented in a data processing system, such as data processing system 200 in FIG. 2. Data stream analyzer application 300 comprises a plurality of algorithms for processing data streams. The plurality of algorithms forms a pipeline in which the data stream is processed serially. In this illustrative example, data stream analyzer application 300 comprises a telephone conversation scanning application which includes three processing algorithms, voice pattern recognition algorithm 302, matching spoken keyword algorithm 304, and embedded data stream matching algorithm 306. A goal of the scanning application is to process a large number of phone calls through the algorithms. Voice pattern recognition algorithm 302, matching spoken keyword algorithm 304, and embedded data stream matching algorithm 306 are initially placed in a pipeline to allow incoming data stream 308 to be processed by the algorithms in a serial manner. Initially, all of the algorithms may be placed in the pipeline in either a random order or an order based on expected computational cost. Although a specific number of and specific types of processing algorithms are shown and described in FIG. 3, it should be noted that any number of algorithms and algorithm types may be used in data stream analyzer application 300 in accordance with the mechanism of the illustrative embodiments.

In this illustrative example, voice pattern recognition algorithm 302 is the first algorithm in the pipeline. Voice pattern recognition algorithm 302 comprises an algorithm that queries the voices in the call to identify if one of the voices matches a particular voice pattern. Using a previously cited example, if the telephone conversation scanning application is being used to discover terrorist activity, voice pattern recognition algorithm 302 may operate by determining if a voice in the phone call matches the voice pattern of a known terrorist (e.g. Osama Bin Laden). When incoming data stream 308 is received at data stream analyzer application 300, voice pattern recognition algorithm 302 processes the data stream to identify data matching the particular query in this algorithm. A match in this particular case comprises a determination that the voice being analyzed is (or has a high likelihood of being) the same as a voice pattern already known to belong to a person of interest. If incoming data stream 308 does not match the query in voice pattern recognition algorithm 302, voice pattern recognition algorithm 302 passes incoming data stream 308 to the next algorithm in the pipeline for further processing. However, if incoming data stream 308 matches the query in voice pattern recognition algorithm 302, voice pattern recognition algorithm 302 notifies data stream analyzer application 300 that a match has been found. As incoming data stream 308 has been determined to contain 'relevant' data, data stream analyzer application 300 then archives incoming data stream 308 in a storage location, such as data storage 310. By archiving incoming data stream 308, incoming data stream 308 may be examined later by more computationally intensive algorithms or by human analysis. Consequently, there is no need for any other algorithms in data stream analyzer application 300 to further process this stream, and thus incoming data stream 308 is not passed to matching spoken keyword algorithm 304 (or embedded data stream matching algorithm 306) in the pipeline.

In this illustrative example, matching spoken keyword algorithm 304 is the next algorithm in the pipeline. Matching spoken keyword algorithm 304 comprises an algorithm that queries the spoken words in the phone call to determine if one or more particular words are uttered in the conversation. For example, in the telephone conversation scanning application used to discover terrorist activity, matching spoken keyword algorithm 304 may operate by determining if a word(s) spoken in the monitored conversation matches a keyword (e.g., "bomb"). Upon receiving incoming data stream 308, matching spoken keyword algorithm 304 processes the data stream to identify data matching the query in this algorithm. If incoming data stream 308 matches the query in matching spoken keyword algorithm 304, matching spoken keyword algorithm 304 notifies data stream analyzer application 300 that a match has been found. Data stream analyzer application 300 may then archive incoming data stream 308 as comprising 'relevant' data in data storage 310. Matching spoken keyword algorithm 304 will pass incoming data stream 308 to the next algorithm in the pipeline for further processing if incoming data stream 308 does not match the query in matching spoken keyword algorithm 304.

Embedded data stream matching algorithm 306 is the next algorithm in the pipeline. Embedded data stream matching algorithm 306 comprises an algorithm that searches for a specific data stream. For example, in the telephone conversation scanning application used to discover terrorist activity, embedded data stream matching algorithm 306 may operate by determining if an attribute of the incoming data stream matches a phone number of interest. When incoming data stream 308 is received from matching spoken keyword algorithm 304, embedded data stream matching algorithm 306 processes the data stream to identify data matching the query in this algorithm. Embedded data stream matching algorithm 306 notifies data stream analyzer application 300 if a match has been found to the query in embedded data stream matching algorithm 306. Data stream analyzer application 300 archives incoming data stream 308 as comprising 'relevant' data in data storage 310. Embedded data stream matching algorithm 306 is the last algorithmic stage in the pipeline. If embedded data stream matching algorithm 306 does not identify a match in incoming data stream 308, data stream analyzer application 300 determines that the stream does not contain relevant data and discards outgoing data stream 312 as a non-relevant stream. In this case, outgoing data stream 312 is removed from further analysis.

Therefore, in the example telephone conversation scanning application, if any one of the three algorithms finds a match in the phone call, the phone call is deemed to be "interesting" and is stored in data storage 310 to allow for further scrutiny of the phone call by an intelligence analyst at a later time.

Figure 4:
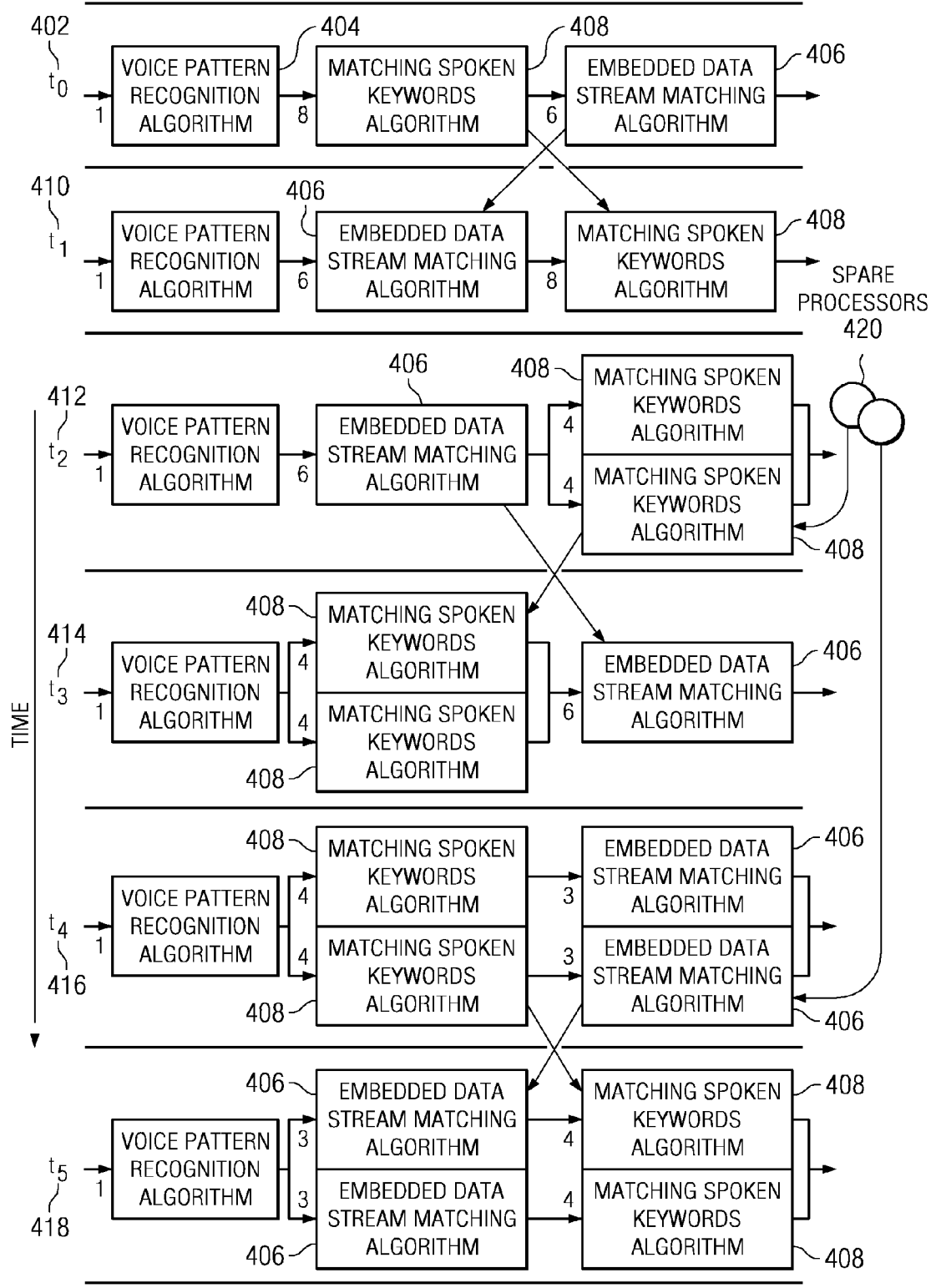
FIG. 4 is a diagram illustrating how processing algorithms in a pipeline in the data stream analyzer system may be reordered in accordance with the illustrative embodiments.

FIG. 4 is a diagram illustrating how processing algorithms in a pipeline in exemplary data stream analyzer system 300 shown in FIG. 3 may be reordered in accordance with the illustrative embodiments. Specifically, FIG. 4 illustrates a state of the exemplary data stream analyzer system (and the ordering of the processing algorithms) at various timestamps. FIG. 4 also illustrates how extra processor capacity may be added to the data stream analyzer application to increase the computational power of the application, and how these additions may affect the current order of algorithms in the pipeline. Extra processor capacity may be defined as any managed resource, such as, for example, more memory, more disk capacity, more central processing units (CPUs) in a single system, more synergistic processing units (SPUs) for a cell system, or whole machines in a cluster (in which case, a "spare processor" is defined as a spare machine), or a combination of any of the managed resources. The telephone conversation scanning application in FIG. 3 for discovering terrorist activity and which comprises a voice pattern recognition algorithm, a matching spoken keyword algorithm, and an embedded data stream matching algorithm is used to illustrate the reordering mechanism of the illustrative embodiments. As previously mentioned, the number and types of processing algorithms shown and described in FIG. 4 are merely used to illustrate the reordering mechanism of the illustrative embodiments, and not to limit the implementation of the mechanism solely to the particular telephone scanning application or algorithms shown.

In this illustrative example, the data stream analyzer system has five available processors to assign to the algorithms. Initially, one processor is assigned to handle each of the three tasks, while two processors are held by the application as spare processors. A pipeline is also created to allow the algorithms to process the data streams in a serial manner. In this pipeline, a phone call is provided to a first algorithm (e.g., voice pattern recognition algorithm) to determine if one of the voices matches a particular voice pattern (e.g., the voice pattern of Osama Bin Laden). Once the first algorithm is finished processing, the call is passed to a second algorithm (e.g., matching spoken keyword algorithm) to determine if one or more particular keywords are uttered in the conversation (e.g., "bomb"). At this point, the first algorithm may receive a second phone call to process. It should be noted that if any algorithm in the telephone conversation scanning application finds its search target (e.g., if the voice recognition algorithm determines that the voice is indeed that of Osama bin Laden), that phone call is immediately stored as a "relevant" data stream. Consequently, that phone call is not processed by any of the remaining algorithms in the pipeline.

The computational cost of each algorithm in the telephone conversation scanning application is determined empirically as the application is running. The process of measuring the computational cost of an algorithm is well known in the art. Application profilers, network monitors, application libraries, and the like are all possible ways to measure the computational costs while the algorithms are run. The computational costs of an algorithm may also change over time. Based on the computational costs determined by the application, the mechanism of the illustrative embodiments reorders the algorithms in the pipeline to allow an algorithm determined to have a lower computational cost run before an algorithm with a higher computational cost. Consequently, algorithms with a higher computational cost are placed at the end of the pipeline in order to reduce the computational power required by the application. The computational power may be reduced because a match found in a prior algorithm in the pipeline will remove the data stream from continuing down the pipeline, thus the more costly algorithms should have fewer data streams to process.

An example of the reordering process is illustrated by showing the states of the application at various timestamps in FIG. 4. Consider, for example, that the algorithms in the pipeline have been determined by the application to have the following initial computational costs at timestamp $t_0$ 402: voice pattern recognition algorithm 404 has a computational cost of 1, embedded data stream matching algorithm 406 has a computational cost of 6, and matching spoken keyword algorithm 408 has a computational cost of 8. In this example, a higher computational cost indicates a more expensive operation, so the matching spoken keyword algorithm is the most costly algorithm to perform. The application will reorder the algorithms in the pipeline in order of lowest computational cost to highest computational cost.

For example, at timestamp $t_1$ 410, since embedded data stream matching algorithm 406 has a computational cost (e.g., 6) lower than the computational cost (e.g., 8) of matching spoken keyword algorithm 408, the application swaps embedded data stream matching algorithm 406 and matching spoken keyword algorithm 408 in the pipeline. Embedded data stream matching algorithm 406 and matching spoken keyword algorithm 408 are swapped to allow embedded data stream matching algorithm 406 to run (process the phone call) before matching spoken keyword algorithm 408 is run.

After a predetermined amount of time has passed, the system undergoes a re-evaluation. This re-evaluation of the system comprises determining if there is a spare processor available. If there is a spare processor, the application assigns the spare processor to the last algorithm in the pipeline (the one with the highest computational cost/lowest throughput). However, if there are no spare processors, the application reclaims a processor from the algorithm at the front of the pipeline with the lowest computational cost and more than one processor assigned. The system re-evaluation in this example occurs after timestamps $t_2$ 412 and $t_4$ 416.

In the re-evaluation, the application adds extra processor capacity (if available) to the algorithm at the end of the pipeline to increase the entire system's throughput. This extra processor capacity may enable the algorithm to decrease its computational cost (and thus increase its throughput) by the number of processors added. For example, at timestamp $t_2$ 412, an extra processing unit (one of spare processors 420) is added to matching spoken keyword algorithm 408 to improve that algorithm's computational cost. Thus, each of the two processors assigned to matching spoken keyword algorithm 408 now has a computational cost of 4.

The improvement to the computational cost of matching spoken keyword algorithm 408 causes the application to again reorder the algorithms in the pipeline in order of lowest computational cost to highest computational cost. For instance, at timestamp $t_3$ 414, because the computational cost per processor (e.g., 4) of matching spoken keyword algorithm 408 is now lower than the computational cost (e.g., 6) of embedded data stream matching algorithm 406, the application moves matching spoken keyword algorithm 408 before embedded data stream matching algorithm 406 in the pipeline.

Since one of the two spare processors 420 is still available in this example, the application then adds this available spare processor to the algorithm at the end of the pipeline. Thus, at timestamp $t_4$ 416, an extra processing unit is added to embedded data stream matching algorithm 406 to improve its computational cost. Consequently, each of the two processors assigned to embedded data stream matching algorithm 406 now has a computational cost of 3.

The improvement to the computational cost of embedded data stream matching algorithm 406 causes the application to again reorder the algorithms in the pipeline in order of lowest computational cost to highest computational cost. For instance, at timestamp $t_5$ 418, since the computational cost (e.g., 3) of embedded data stream matching algorithm 406 is now lower than the computational cost (e.g., 4) of matching spoken keyword algorithm 408, the application moves embedded data stream matching algorithm 406 before matching spoken keyword algorithm 408 in the pipeline.

Thus, with the reordering mechanism in the illustrative embodiments, bottlenecks may be bubbled back through the pipeline, and extra processor capacity may be added to the end of the pipeline. Adding the extra processor capacity to an algorithm at the end of the pipeline may cause the algorithm to be bubbled up toward the front of the pipeline if the throughput of the algorithm is increased over an earlier algorithm in the pipeline. If the last algorithm has an especially high computational cost, the algorithm may potentially have all the spare processors assigned to it. Since the algorithm with the highest computational cost is moved to the end of the pipeline, the pipeline bottleneck will always be located at the end of the pipeline.

The empirically-determined computational cost of any algorithm may change (e.g., such as when there is a change in the nature of the analyzer workload). The mechanism of the illustrative embodiments may respond to any such changes in the empirically-determined computational cost by bubbling back the bottlenecks to the end of the pipeline, and adding extra capacity to the end of the pipeline as appropriate. Thus, the system may dynamically reorder the algorithms in the application to accommodate changing workloads.

Figure 5:
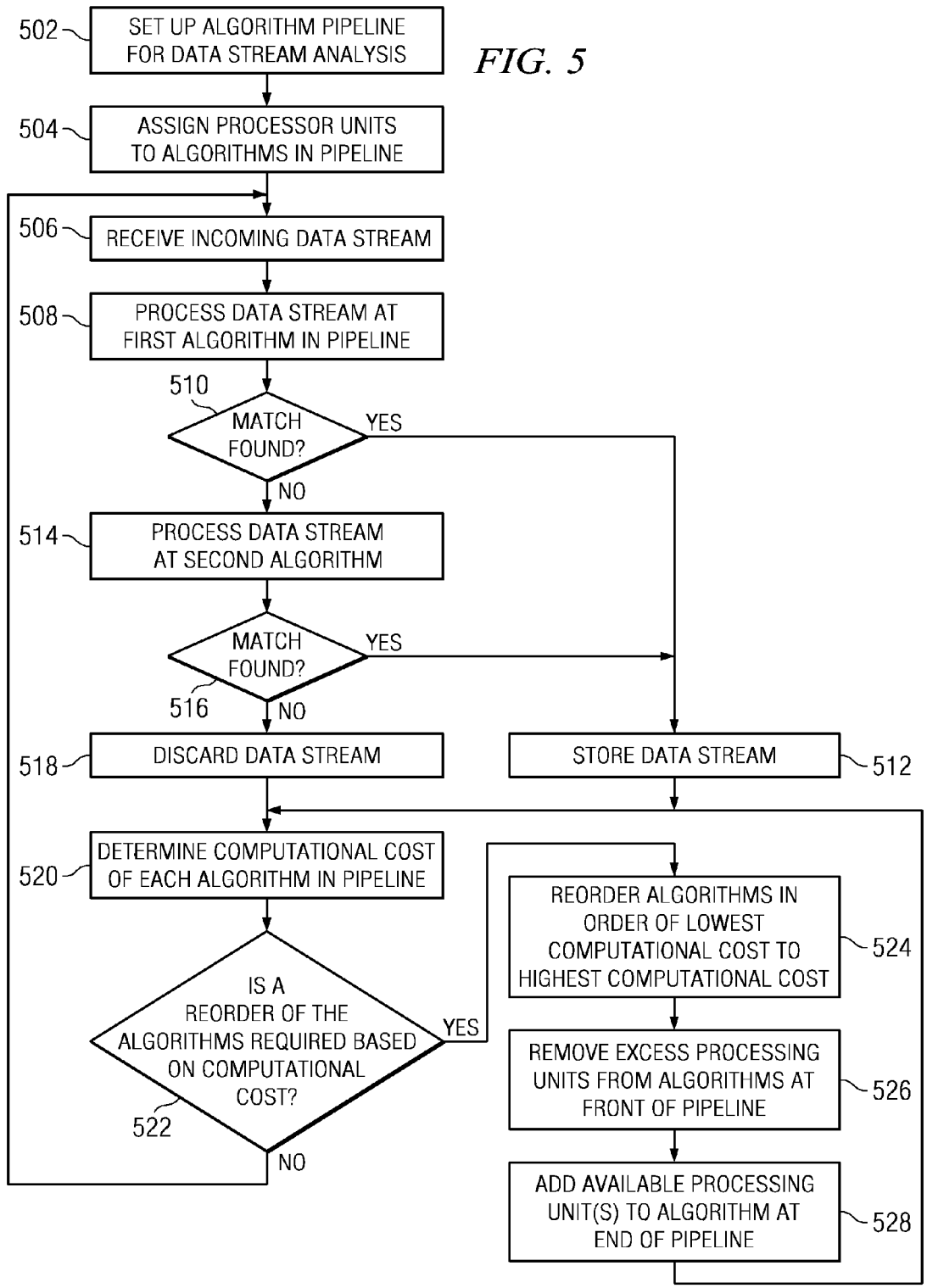
FIG. 5 is a flowchart of a process for dynamically scheduling algorithms in a pipeline which operate on a stream of data in accordance with the illustrative embodiments.

FIG. 5 is a flowchart of a process for dynamically scheduling algorithms in a pipeline which operate on a stream of data in accordance with the illustrative embodiments. The process described in FIG. 5 may be implemented using a data processing system, such as data processing system 200 in FIG. 2. A data stream processing application, such as data stream processing application 300 in FIG. 3, may provide various algorithms for querying the data to determine whether or not the data stream may contain relevant data.

The process begins with arranging algorithms in a data stream analyzer application into a pipeline of algorithmic stages for operating on streams of data (step 502). The data stream analyzer application in this exemplary process comprises two algorithms, although additional algorithms may also be implemented in the pipeline. The data stream analyzer application assigns a processor unit to each of the algorithms in the pipeline to execute the algorithms (step 504). Extra processors that are available to the application but were not assigned to an algorithm are held as spare processors. These spare processors may subsequently be used to provide extra processing capacity to one or more algorithms in the pipeline.

When the data stream analyzer application receives an incoming data stream (step 506), the first algorithm in the pipeline is run and operates on the stream (step 508). A determination is made by the first algorithm as to whether the data stream matches a query in the algorithm (step 510). If a match is found ('yes' output of step 510), the data stream analyzer application stores the data stream in a memory location (step 512). The process then continues to step 520.

Turning back to step 510, if no match is found ('no' output of step 510), the data stream is passed to the second algorithm, which runs and operates on the data stream (step 514). A determination is made by the second algorithm as to whether the data stream matches a query in the algorithm (step 516). If a match is found ('yes' output of step 516), the data stream analyzer application stores the data stream in a memory location (step 512). The process then continues to step 520.

Turning back to step 516, if no match is found ('no' output of step 516), the data stream analyzer application discards the data stream since the data stream does not contain any relevant data (step 518). The data stream analyzer application also determines the computational cost of each of the algorithms in the pipeline (step 520). A determination is made by the data stream analyzer application as to whether two or more algorithms in the pipeline should be reordered based on the computation cost of the algorithms (step 522). Reordering of algorithms in the pipeline is required if the determined computational cost of one algorithm is lower than the determined computational cost of another algorithm placed earlier in the pipeline.

If no more algorithms in the pipeline need to be reordered ('no' output of step 522), the process returns to step 506 to process another incoming data stream. However, if two or more algorithms in the pipeline should be reordered ('yes' output of step 522), the data stream analyzer application reorders the algorithms in order of lowest computational cost to highest computational cost (step 524). The algorithms with the lower computational costs are placed at the front of the pipeline, while the algorithms with the higher computational costs are placed at the end of the pipeline.

The data stream analyzer application may also remove excess processing units from algorithms at the front of the pipeline (step 526). The data stream analyzer application also adds extra processor capacity to the algorithm with the highest computation cost (step 528). Since the algorithm with the highest computational cost is a bottleneck in the data stream processing, a processor(s) is added to the algorithm to decrease the algorithm's computational cost and increase the throughput of the algorithm. The process then loops back to step 520 to re-determine the computational costs of each algorithm in view of the addition of extra processor capacity to the algorithm at the end of the pipeline, and reorder the algorithms again as necessary.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for dynamically scheduling algorithms in a pipeline which operate on a stream of data, the computer implemented method comprising:
    determining a computational cost of each algorithm in a plurality of algorithms in a pipeline, wherein the plurality of algorithms in the pipeline processes an incoming data stream in a first sequential algorithm order;
    reordering the plurality of algorithms in the pipeline to form a second sequential algorithm order based on the computational cost of each algorithm;
    executing the plurality of algorithms in the second sequential algorithm order;
    assigning a spare processing unit to an algorithm at an end of the pipeline; and
    redetermining the computational cost of each algorithm in the plurality of algorithms in the pipeline, wherein the computational cost of the algorithm at the end of the pipeline is reduced by adding the additional spare processing unit to the algorithm at an end of the pipeline.

2. The computer implemented method of claim 1, further comprising:
    reordering the plurality of algorithms in the pipeline to form a third sequential algorithm order based on the redetermined computational cost of each algorithm; and executing the scheduled algorithms in the third sequential algorithm order.

3. The computer implemented method of claim 2, wherein the plurality of algorithms in the second sequential algorithm order comprises algorithms ordered from a lowest computational cost at the front of the pipeline to a highest computational cost at the end of the pipeline.

4. The computer implemented method of claim 1, further comprising:
reclaiming a processor from an algorithm at the front of the pipeline, wherein the algorithm at the front of the pipeline has a lowest computational cost and at least two processors assigned; and
assigning the reclaimed processor to the algorithm at the end of the pipeline.

5. The computer implemented method of claim 4, wherein the processor is reclaimed from the algorithm at the front of the pipeline in response to a determination that no spare processors are available.

6. The computer implemented method of claim 1, wherein assigning a spare processing unit to the algorithm at an end of the pipeline increases throughput of the algorithm.

7. The computer implemented method of claim 1, wherein assigning a spare processing unit to the algorithm at an end of the pipeline is performed responsive to a determination that a spare processing unit is available.

8. The computer implemented method of claim 1, wherein a match found in an algorithm processing the incoming data stream removes the incoming data stream from being processed by remaining algorithms in the pipeline.

9. The computer implemented method of claim 1, wherein assigning a spare processing unit to an algorithm at an end of the pipeline moves the algorithm towards the front of the pipeline.

10. A data processing system for dynamically scheduling algorithms in a pipeline which operate on a stream of data, the data processing system comprising:
a bus;
a storage device connected to the bus, wherein the storage device contains computer usable code;
at least one managed device connected to the bus;
a communications unit connected to the bus; and
a processing unit connected to the bus, wherein the processing unit executes the computer usable code to determine a computational cost of each algorithm in a plurality of algorithms in a pipeline, wherein the plurality of algorithms in the pipeline processes an incoming data stream in a first sequential algorithm order; reorder the plurality of algorithms in the pipeline to form a second sequential algorithm order based on the computational cost of each algorithm; execute the plurality of algorithms in the second sequential algorithm order; assign a spare processing unit to an algorithm at an end of the pipeline; and redetermine the computational cost of each algorithm in the plurality of algorithms in the pipeline, wherein the computational cost of the algorithm at the end of the pipeline is reduced by adding the additional spare processing unit to the algorithm at an end of the pipeline.

11. The data processing system of claim 10, wherein the processing unit further executes the computer usable code to reorder the plurality of algorithms in the pipeline to form a third sequential algorithm order based on the redetermined computational cost of each algorithm; and execute the scheduled algorithms in the third sequential algorithm order.

12. A computer program product for dynamically scheduling algorithms in a pipeline which operate on a stream of data, the computer program product comprising:
a computer readable media that is non-transitory having computer usable program code tangibly embodied thereon, wherein the computer usable program code includes:
computer usable program code for determining a computational cost of each algorithm in a plurality of algorithms in a pipeline, wherein the plurality of algorithms in the pipeline processes an incoming data stream in a first sequential algorithm order;
computer usable program code for reordering the plurality of algorithms in the pipeline to form a second sequential algorithm order based on the computational cost of each algorithm;
computer usable program code for executing the plurality of algorithms in the second sequential algorithm order;
computer usable program code for assigning a spare processing unit to an algorithm at an end of the pipeline; and
computer usable program code for redetermining the computational cost of each algorithm in the plurality of algorithms in the pipeline, wherein the computational cost of the algorithm at the end of the pipeline is reduced by adding the additional spare processing unit to the algorithm at an end of the pipeline.

13. The computer program product of claim 12, wherein the computer usable program code also includes:
computer usable program code for reordering the plurality of algorithms in the pipeline to form a third sequential algorithm order based on the redetermined computational cost of each algorithm; and
computer usable program code for executing the scheduled algorithms in the third sequential algorithm order.

14. The computer program product of claim 13, wherein the plurality of algorithms in the second sequential algorithm order comprises algorithms ordered from a lowest computational cost at the front of the pipeline to a highest computational cost at the end of the pipeline.

15. The computer program product of claim 12, wherein the computer usable program code also includes:
computer usable program code for reclaiming a processor from an algorithm at the front of the pipeline, wherein the algorithm at the front of the pipeline has a lowest computational cost and at least two processors assigned; and
computer usable program code for assigning the reclaimed processor to the algorithm at the end of the pipeline.

16. The computer program product of claim 15, wherein the processor is reclaimed from the algorithm at the front of the pipeline in response to a determination that no spare processors are available.

17. The computer program product of claim 12, wherein the computer usable program code for assigning a spare processing unit to the algorithm at an end of the pipeline increases throughput of the algorithm.

18. The computer program product of claim 12, wherein the computer usable program code for assigning a spare processing unit to the algorithm at an end of the pipeline is executed responsive to a determination that a spare processing unit is available.

19. The computer program product of claim 12, wherein a match found in an algorithm processing the incoming data stream removes the incoming data stream from being processed by remaining algorithms in the pipeline.

20. The computer program product of claim 12, wherein the computer usable program code for assigning a spare processing unit to an algorithm at an end of the pipeline moves the algorithm towards the front of the pipeline.

* * * * *